(12) United States Patent
Jarman (10) Patent No.: US 6,167,928 B1
(45) Date of Patent: Jan. 2, 2001

(54) HELICOPTER LOGGING SYSTEM

(76) Inventor: Philip Jarman, #197, 9B-1150 N. Terminal Avenue, Nanaimo, British Columbia (CA), V9S 5T8

( * ) Notice: Under 35 U.S.C. 154(b), the term of this patent shall be extended for 0 days.

(21) Appl. No.: 09/084,203

(22) Filed: May 26, 1998

(51) Int. Cl.$^7$ ................................................. A01G 23/08
(52) U.S. Cl. .......................... 144/336; 144/4.1; 144/34.1; 144/335; 294/137.1
(58) Field of Search .................................. 144/4.1, 24.13, 144/34.1, 335, 336; 294/106, 112, 137.1; 83/928; 156/556, 566

(56) References Cited

U.S. PATENT DOCUMENTS

| | | | |
|---|---|---|---|
| 3,667,515 | * 6/1972 | Corey ................................. | 144/24.12 |
| 4,152,019 | 5/1979 | Jarman et al. ...................... | 294/112 |
| 4,662,414 | * 5/1987 | Fandrich .............................. | 144/4.1 |
| 4,815,263 | * 3/1989 | Hartung et al. ..................... | 144/24.13 |
| 4,848,703 | 7/1989 | Coulson et al. .................... | 244/137.1 |
| 4,881,582 | * 11/1989 | Ketonen ............................... | 144/4.1 |
| 5,305,972 | * 4/1994 | Hancocks ............................ | 144/4.1 |

FOREIGN PATENT DOCUMENTS

| | | |
|---|---|---|
| 2014776 | 6/1994 | (RU) . |
| 1074432 | 2/1984 | (SU) . |

* cited by examiner

*Primary Examiner*—W. Donald Bray
(74) *Attorney, Agent, or Firm*—Robert H. Barrigar (57) ABSTRACT

A method of logging a tree includes the steps of cutting the tree part way through the trunk with a cut near the bottom thereof, leaving a connecting portion of the trunk connecting an upper portion of the trunk above the cut to a lower portion of the trunk below the cut. A helicopter above the tree is connected to a point near the top of the trunk. The helicopter is moved away from the tree, thereby breaking the connecting portion and allowing the upper portion of the tree to be carried away by the helicopter. The method utilizes a helicopter logging tool comprising a body having a connection for a lifting device. There is a hook on the body guide connected to the body by a hinge. The guide extends vertically downwards away from the body when the tool is connected only to the lifting device. There is a hook on the body to one side of the guide for engaging an object. When the hook engages an object and the body is lifted by the lifting device, the body rotates and the guide rotates about the hinge so that the guide continues to extend vertically. There is also a jig apparatus for cutting the tree. There are two guides bars, at least one of which has a stop mechanism. Spikes allow the guide bars to be connected to the trunk of the tree in horizontal, parallel positions on opposite sides thereof. A chain saw mount is slidingly received on each of the guide bars. When a chain saw is placed on the chain saw mounted and moved towards the trunk of the tree along the guide bars, the tree is cut to a position determined by the stop mechanism on the guide bars.

19 Claims, 7 Drawing Sheets

HELICOPTER LOGGING SYSTEM

BACKGROUND OF THE OF INVENTION

This invention relates to a systems for logging using helicopters and, in particular, selectively logging relatively large trees by helicopter.

The most common method of logging today is probably clear-cut logging where a large area of forest is completely cleared. Commercially useful trees are removed, while remaining debris is usually burned. However, there are situations where clear-cut logging is not feasible or desirable. For one thin, it has become increasingly unpopular amongst environmental groups. Clear cuts can have a high visual impact to the public and, unless carefully controlled, can lead to a loss of adjacent trees due to windfall. Helicopter logging, that is logging where the trees are removed initially by helicopter, is a well-known technique. For example, one system of lifting and transporting felled timber is disclosed in my earlier U.S. Pat. No. 4,152,019.

Soviet Union Patent 1074432 discloses a system of logging by blasting tree roots loose by explosives while a helicopter yards them upwards.

Another procedure is disclosed in Russian Patent 2014776. This procedure is used when clearing paths through forest for roads or the like. Air flow from the helicopter rotor is directed onto the crowns of the trees so that they are blown downwards toward a clearing.

Despite these earlier methods, there remains a need for an improved method for selectively logging relatively large trees without requiring, for example, the construction of environmentally damaging roads through the forest.

It is therefore an object of the invention to provide an improved system for logging which permits selective, relatively large trees to be initially removed by helicopter without adversely affecting adjacent growth.

It is also an object of the invention to provide an improved system for helicopter logging which is economical to utilize for many different situations.

SUMMARY OF THE INVENTION

There is provided, according to one aspect of the invention, a helicopter logging tool which comprises a body having first means thereon for connecting the body to a lifting device. An elongated guide is connected to the body by a hinge and extends vertically away from the body when the tool is connected only to the lifting device by the first means. There is second means on the body to one side of the guide for engaging an object. When the second means engages an object and the body is then lifted by the lifting device, the body rotates and the guide rotates about the hinge so that the guide continues to extend vertically.

There is provided, according to another aspect of the invention, a method of logging a tree having a trunk with a top and bottom. The method comprises the step of cutting the tree part way through the trunk with a cut near the bottom thereof, leaving a connecting portion of the trunk connecting an upper portion of the trunk above the cut to a lower portion of the trunk below the cut. A helicopter above the tree is connected to a point near the top of the trunk. The helicopter moves away from the tree, thereby breaking the connecting portion and allowing the upper portion of the trunk to be carried away by helicopter.

There is provided, according to a further aspect of the invention, a jig apparatus for cutting a tree having a trunk. The apparatus includes two guide bars, at least one of the guide bars having a stop mechanism. There is means for connecting the guide bars to the trunk of the tree in horizontal, parallel positions on opposite sides thereof. A chain saw mount is slidingly received on each of the guide bars. When the chain saw is placed on the chain saw mounts and moved towards the trunk of the tree along the guide bars, the tree is cut to a position determined by the stop mechanism on the guide bars.

There is provided, according to a still further aspect of the invention, a helicopter logging apparatus which includes a helicopter having a pilot's seating position, a center of gravity, a first attachment point below the helicopter to one side of the pilot's seating position and a second attachment point below the center of gravity. A first cable is connected to the first attachment point and a second cable is connected to the second attachment point. There is means for lengthening the first cable. A grapple has a body with a top, a bottom and a side. There is a first attachment means on the top and a second attachment means on the top spaced apart from the first attachment means. The first cable is connected to the first attachment means of the grapple and the second cable is connected to the second attachment means of the grapple. An elongated guide is connected to the body at the bottom thereof by a hinge. There is hook means on the side of the body for engaging an object.

DETAILED DESCRIPTION OF THE PREFERRED EMBODIMENTS

Figure 1:
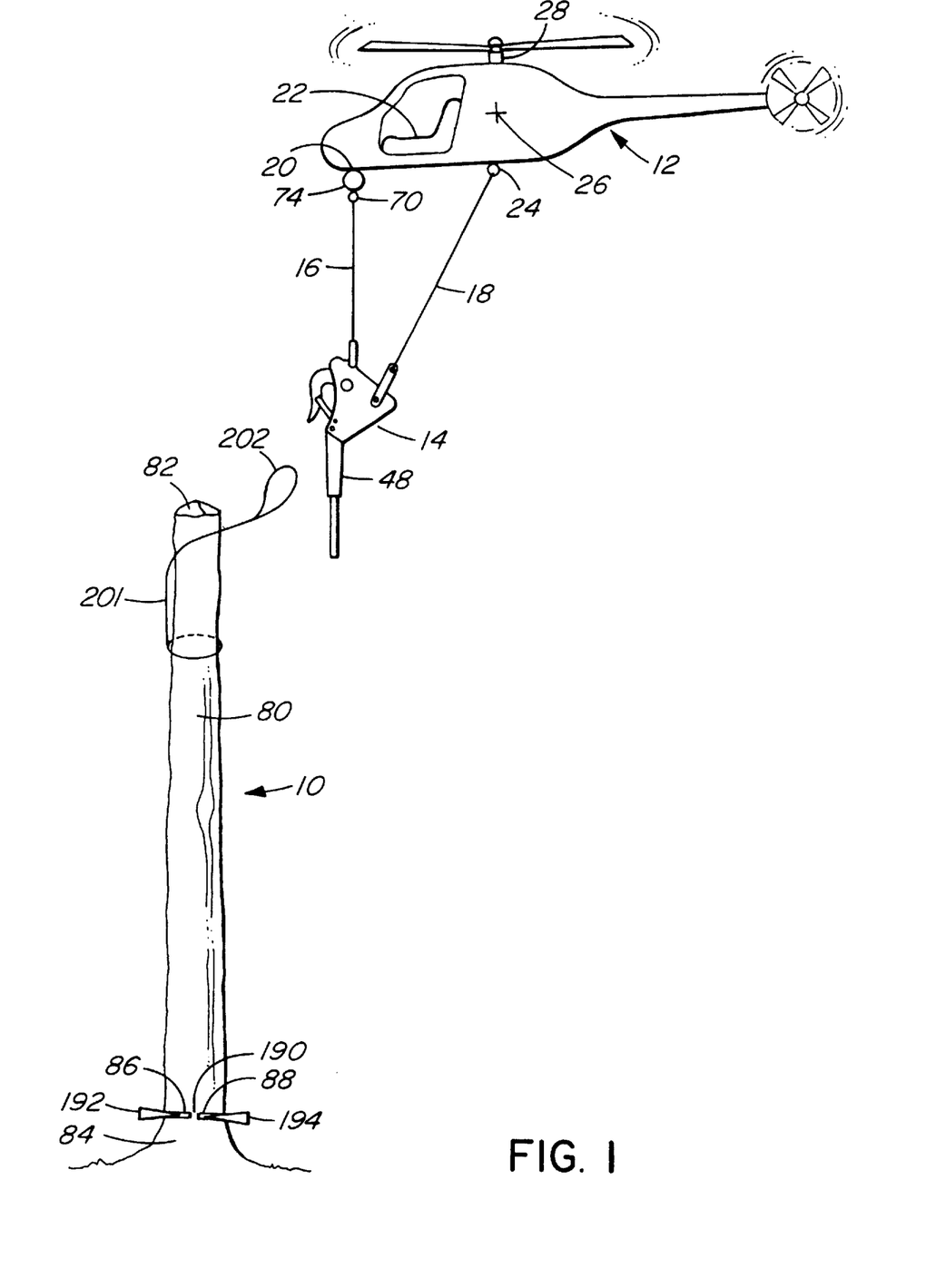
FIG. 1 is a side view of a helicopter approaching a topped tree with a logging tool, according to an embodiment of the invention, while employing a method of logging the tree according to the invention.

Referring to the drawings, and first to FIG. 1, these illustrate a method of logging a tree 10 using a helicopter 12 provided with a tool or grapple 14 suspended from the helicopter by a pair of cables 16 and 18. The tool 14 is suspended below a first attachment point 20 which is below the helicopter and to one side of the pilot's seating position 22. Thus the tool 14 can be viewed easily by the helicopter pilot. The second cable 18 is connected to the helicopter at a second attachment point 24 which is below the center of gravity 26 of the helicopter and its rotor shaft 28.

Figure 3:
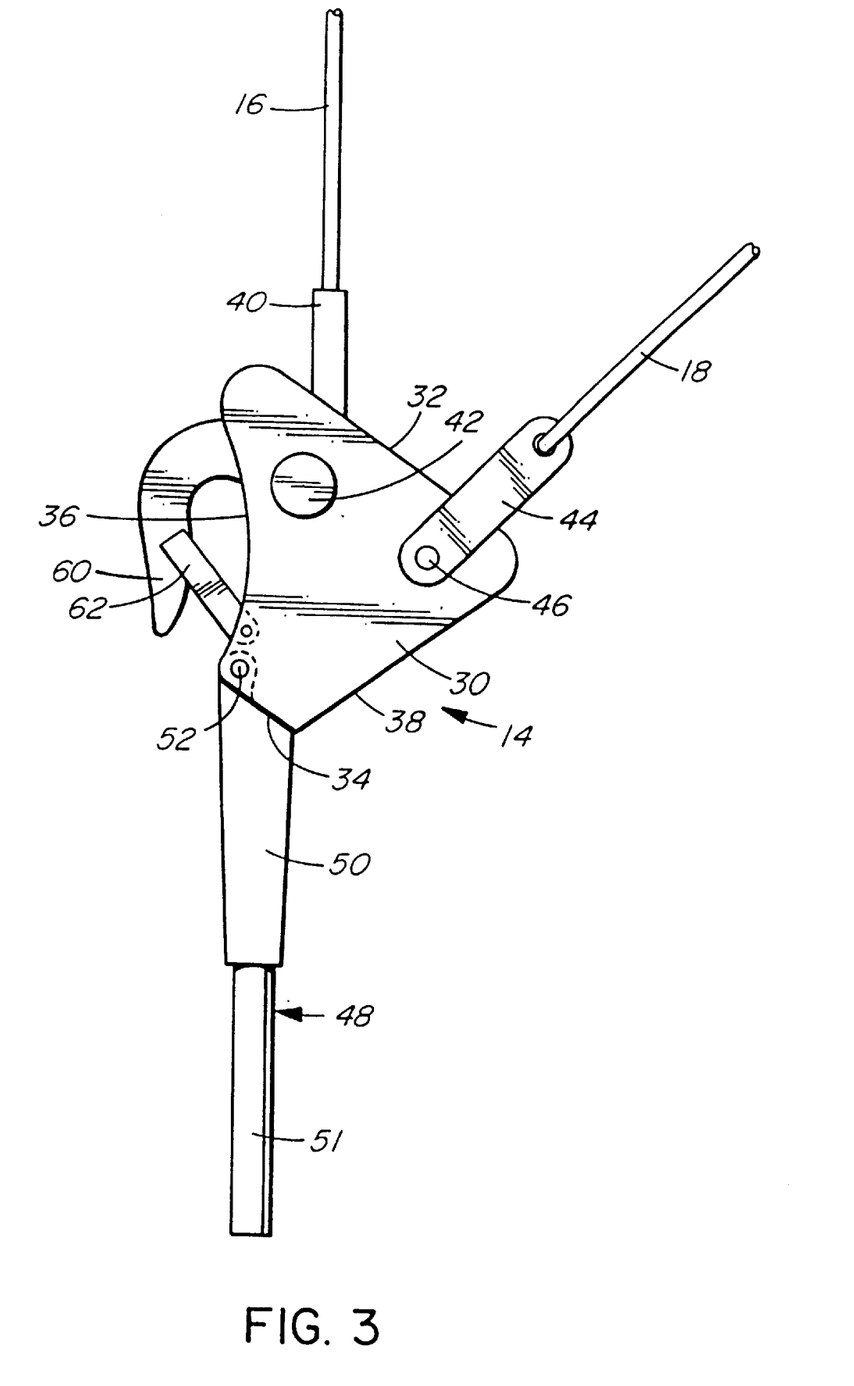
FIG. 3 is an enlarged, side elevational view of the tool of FIGS. 1 and 2.
Figure 4:
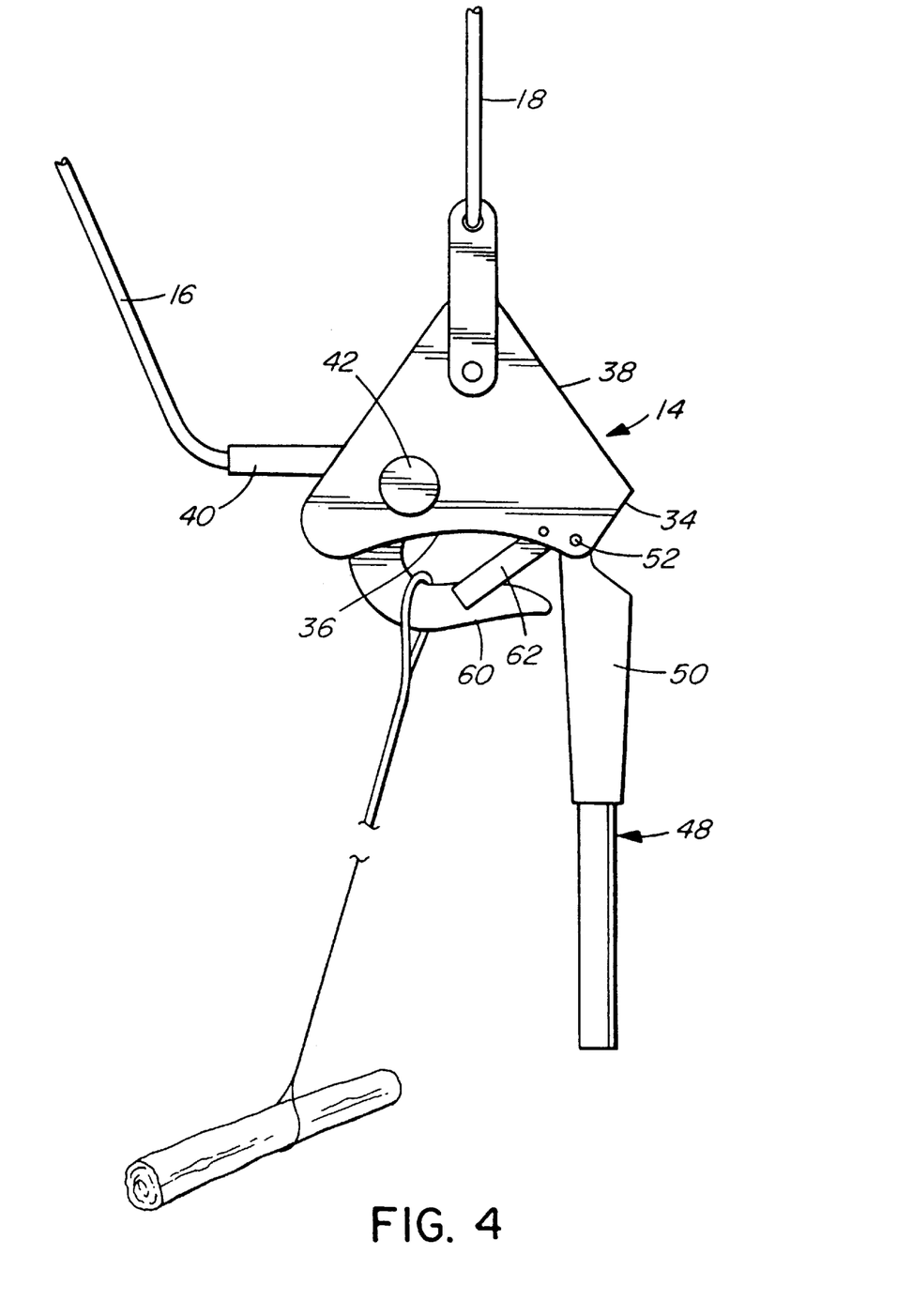
FIG. 4 is a view similar to FIG. 3, showing the position of the tool while carrying the trunk of the tree.

The tool or grapple 14 is shown in better detail in FIGS. 3 and 4. The tool has a body 30 with a top 32, a bottom 34 and opposite sides 36 and 38. These parts are identified with reference to the position of the tool shown in FIGS. 1 and 3.

Figure 9:
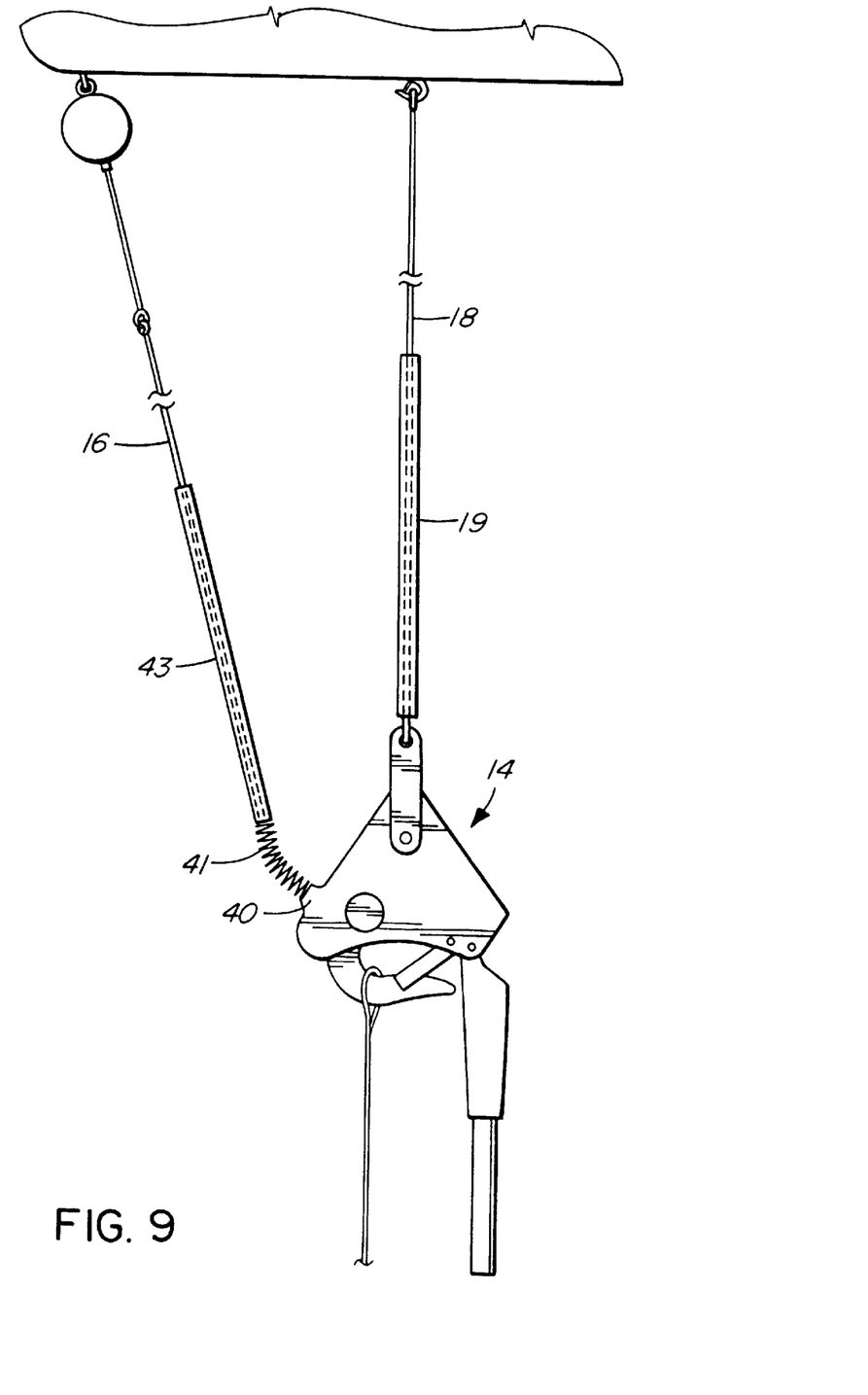
FIG. 9 is an enlarged view of the cables and tool oriented as when carrying a load.

The body has first means thereon for connecting the body to lifting device, in this case the helicopter and cables 16 and 18. In this example the first means includes a machined metal stub 40 which is screwed into the body and a cable connector 44 connected to the body by a swivel 46. Cable 16 is connected to stub 40 and cable 18 is connected to the body by cable connector 44. Tubing 19, of PVC in this example, extends over cable 18 as seen in FIG. 9. The cable connector and stub are adjacent the top 32 of the body and spaced-apart from each other. There is a heavy duty spring 41 adjacent stub 40 as seen in FIG. 9. A pipe 43 of aluminum and 8' long in this example, extends over cable 16 adjacent the spring. Tubing 19 and pipe 43 inhibit winding up of the cables.

The body also has an elongated guide 48, having a tapered proportion 50 which decreases in cross sectional extent outwardly from the body. The guide 48 is connected to the body by a hinge 52 at the bottom 34 of the body.

There is a flexible extension 51 to the guide. In this example the extension is a flexible radiator hose filled with sand and plugged at the bottom end.

There is second means on the body on one side of the guide, namely side 36 of the body, for engaging an object. In this case the second means includes a hook 60 and a safety catch 62 which is hingedly connected to the body and prevents slings and the like from becoming disengaged after they are received on the hook. This is a standard Breeze Eastern Hook employing an electro-mechanical release device, including electrical actuator 42, which allows slings and like to be released from the hook when desired. This is conventional and, accordingly, is not described in more detail.

Cable 18 is a fixed length cable extending between attachment point 24 on the helicopter and cable connector 44. However cable 16 is connected at a point 70 to a tensioning line 72 normally wound on tool balancer 74. The tool balancer is a cylindrical housing with an attachment point on top and a spring loaded drum inside. This tool balancer is conventional and accordingly is not described in more detail. When a load is applied to the hook, the tensioning line is pulled from the tool balancer. When the load is released, the tool balancer is capable of carrying the weight of tool 14 and rewinds the tension line. The tension line is shown pulled out of the tool balancer in FIG. 2 and is wound on the tool balancer in FIG. 1.

Figure 2:
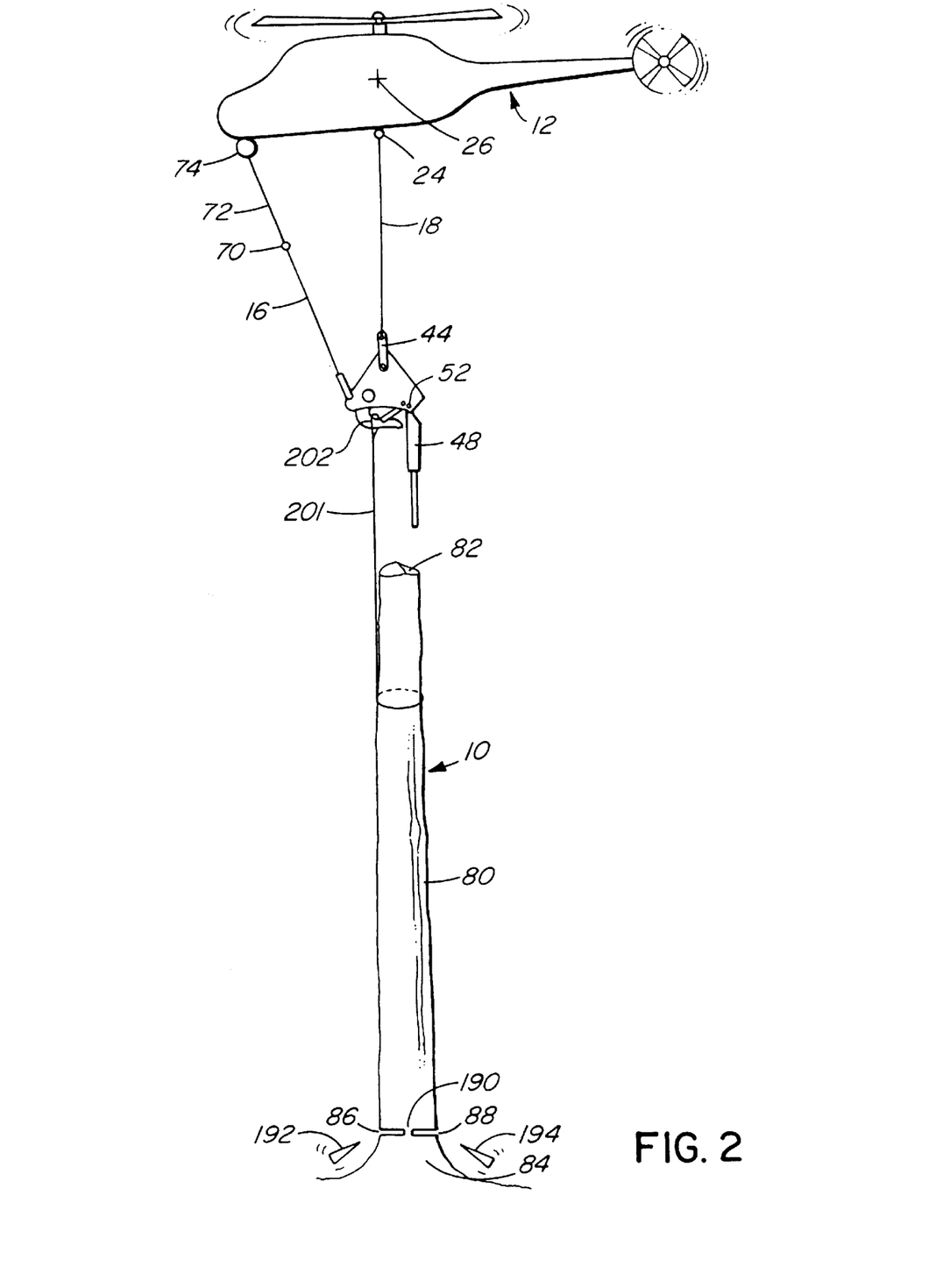
FIG. 2 is a view similar to FIG. 1, showing the helicopter and tree after the tool on the helicopter has engaged a cable secured to the tree.

Referring to FIGS. 1 and 2, the tree 10 has a trunk 80 with a top 82 and a bottom 84. The tree in this example has been topped, as may be seen in the drawings, and has been partially cut through by two cuts 86 and 88 on opposite sides of the trunk near the bottom thereof.

Figure 5:
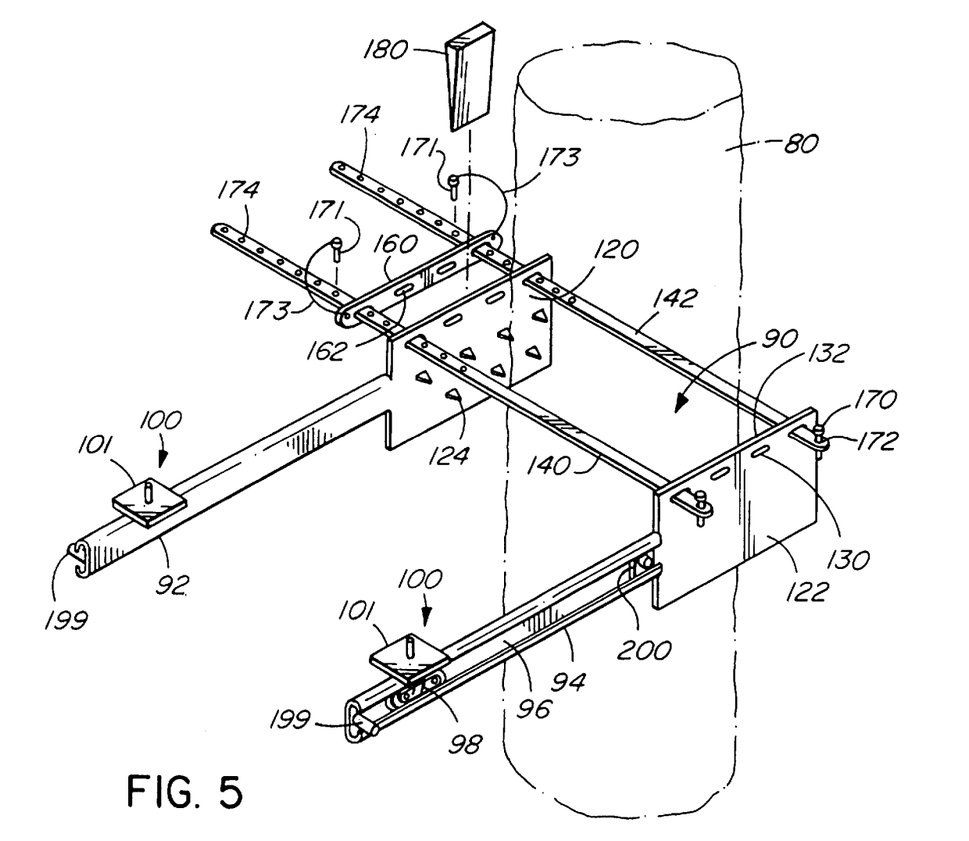
FIG. 5 is in a top, side isometric view of a jig apparatus for cutting the trunk of the tree, according to an embodiment of the invention.
Figure 6:
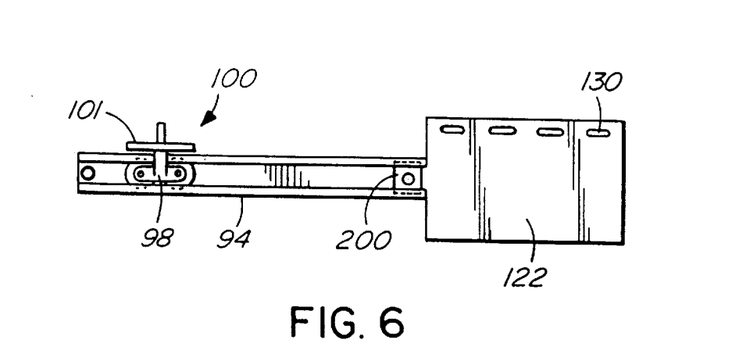
FIG. 6 is a side elevation of a guide bar thereof.
Figure 7:
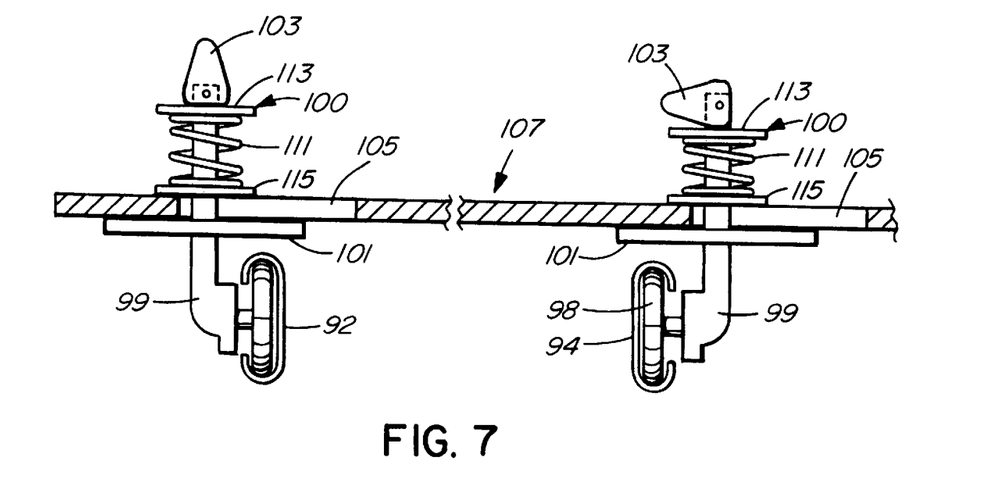
FIG. 7 is an end view thereof.
Figure 8:
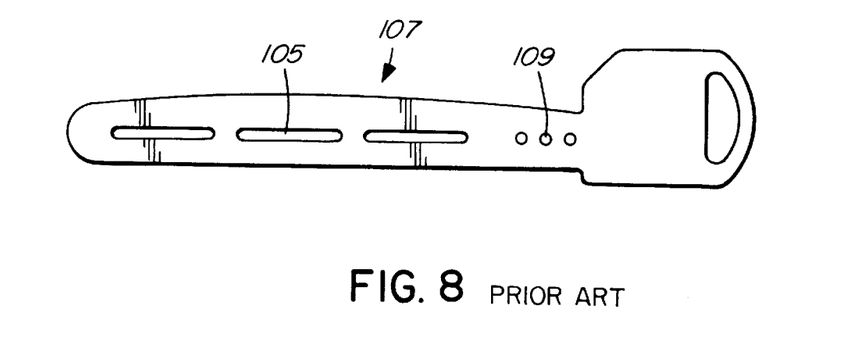
FIG. 8 is a top plan of a chain saw bar.

Referring to FIG. 5, this shows a jig apparatus 90 used for making one of the cuts in the trunk of the tree. The jig apparatus includes two guide bars 92 and 94 which, in this example, are channels which open outwards away from tree trunk 80, forming a guide track 96 extending longitudinally along the inside of each guide bar. This guide track receives a double roller truck 98 connected to a chain saw mount 100 on the top of each of the guide bars. Each mount includes a plate 101 which has an L-shaped shaft 99 with the truck 98 mounted on the bottom as seen in FIG. 7. There is a toggle 103 on the top of the shaft and a pair of spaced-apart washers 113 and 115 with a coil spring 111 therebetween. The toggles are rotated to the position for guide bar 92 to install the chain saw bar, washer 113, spring 111 and washer 115 in that order. The toggle is then rotated to the position for guide bar 94.

There is a means for connecting the guide bars to the trunk of the tree in horizontal, parallel positions on opposite sides of the trunk as seen FIG. 5. This means includes a plate 120 connected to guide bar 92 and a similar plate 122 connected to guide bar 94. Each plate has a plurality of inwardly directed spikes 124 which can be hammered into the tree trunk, thus attaining the position of each guide bar shown in FIG. 5. Each plate has a series of slots 130 along top 132 thereof which can receive one of the connecting bars 140 and 142. There is also a keeper bar 160 with a series of slots 162 to similar to the slots 130 in the plates 120 and 122. The slots in this bar are fitted over the ends of connecting bars 140 and 142 extending outwardly from plate 120. Each of the connecting bars has a pin 170 at one end and a removeable pin 171 at the opposite end. The pins 171 are secured to keeper bar 160 by a wire 173. There is a single aperture 172 at one end of each bar and a series of apertures 174 at the opposite end. One pin 170 is fitted fixedly through each aperture 172 and another pin is 171 is removeably fitted through a selected aperture 174 which is closest to the keeper bar 160, after the keeper bar is held adjacent the trunk of the tree. A wedge 180 is driven between the keeper bar and guide bar 92 to keep the jig apparatus tight against the tree.

Once the tree has been topped, an initial cut is made in the tree approximately two-thirds the way through the trunk. This may be, for example, cut 88 shown in FIG. 1 and FIG. 2. This cut is made against the led of the tree. Wedges 194 are inserted and the saw bar is removed. The jig apparatus is used to position and dimension the second cut 86 such as to leave a connecting portion 190 between the first cut and the second cut which is capable of supporting the tree trunk 80 until the helicopter arrives, at least in conjunction with a series of wedges 192 and 194 which are driven into the cuts to support the tree on each side of the connecting portion 190. The wedges are taped in with high visibility tape to make them conspicuous and keep them in place if the tree rocks in the wind.

After the first cut 88 is made, the connecting bar 140, with plate 122 in place, is positioned in the cut 88 snug up against the connecting portion 190. The spikes 124 are driven into the tree trunk. The connecting bar 142 is then positioned between pairs of slots 130 outwardly from the tree trunk to stabilize the equipment. The guide bar 92 is now fitted over the connecting bars and spikes 124 of its plate 120 are pounded into the tree. The keeper bar 160 is fitted over the ends of the connecting bars projecting from plate 120 and the pins 170 are fitted through the apertures in the connecting bars. Finally one or more wedges 180 are driven between the keeper bar and bar 92 to tighten the assembly against the tree.

After the assembly is properly positioned, the saw bar 107 of a chain saw can be mounted on the tops of plates 101 and the chain saw pushed, while running, along the guide bars towards the tree. There are two stop mechanisms on each guide bar. Stop mechanism 199 on the end distal the tree and an adjustable stop mechanism 200 on each guide bar, which contacts truck 98 to prevent the roller trucks moving further towards the tree and, accordingly, keeps the cuts 86 and 88 from merging. Each stop mechanism 200 is moveable by an Allen screw adjustment. The amount of connecting portion 190 left is calculated depending upon the species of tree, its moisture content, diameter and other such factors as the amount of lean of the tree. Typically it is between ¼" and 2". As discussed above, wedges 192 and of 194 are driven into the cuts 86 and 88 to support the trunk of the tree until the helicopter arrives.

After the tree is topped, the logger attaches a cable 201 to the top of the tree, leaving a loop 202 projecting from the top 82 of the trunk. A significant length of cable beyond the loop is wound around the trunk of the tree and secured thereto as seen in FIG. 1. The loop (or choke) 202 is located on the low side of a leaning tree.

When the helicopter arrives, as seen in FIG. 1, the guide extends vertically downwards as shown. Spring 41, shown in FIG. 9, is straight when the tool is oriented as in FIG. 1. After this is accomplished, the loop 202 is received by hook 60. The guide 48 allows the pilot to determine his height and displacement from the loop 202. The device bumps the loop from the outside and serves to keep the hook 60 oriented correctly. As the helicopter is lowered, the hook engages the loop. The pilot then moves the helicopter upwards, thus pulling cable 201 away from the tree trunk, tightening the cable and reducing the size of the loop as seen in FIG. 2. At the same time, the load on the hook rotates the hook to the position shown in FIG. 2, and pulls tension line 72 from tool balancer 74. Accordingly the tool is then suspended below the attachment point 24 and center of gravity 26 of the helicopter by cable 18 connected to cable connector 44. This rotation of the tool causes the guide 48 to rotate relative to the tool about hinge 52, as shown in FIG. 2, such that the guide continues its vertical orientation pointing away from the tool. This inhibits the tool from spinning. Spring 41 is bent to the shape shown in FIG. 9 when the tool is in the position of FIG. 2.

The pilot then flies the helicopter away from vertical alignment with the tree trunk and releasing the wedges 192 and 194 as seen in FIG. 2. The leverage achieved by the distance between the attachment point for cable 201 and connecting portion 190, namely the length of the tree trunk, provides sufficient force to break the connecting portion, assuming it has been sized correctly. Once this is broken, the helicopter can lift the tree trunk vertically upwards and carry it to a remote site for further transport. When the load is released, the spring 41 and tool balancer 74 re-orient the tool to the position of FIG. 1.

It will be appreciated by someone skilled in the art that many of the details provided above are by way of example only and are not intended to limit the scope of the invention which is to be interpreted with reference to the following claims.

What is claimed is:

1. A method of logging a tree having a trunk with a top and a bottom, comprising the steps of:
    cutting the tree part way through the trunk with a cut near the bottom thereof, leaving a connecting portion of the trunk connecting an upper portion of the trunk above the cut to a lower portion of the trunk below the cut;
    connecting a helicopter above the tree to a point near the top of the trunk; and
    moving the helicopter away from the tree, thereby breaking the connecting portion and allowing the upper portion of the trunk to be carried away by helicopter.

2. A method as claimed in claim 1, wherein the upper portion of the trunk is supported adjacent the cut after cutting the tree part way through the trunk.

3. A method as claimed in claim 1, wherein two cuts are made part way through the trunk, the connecting portion being between the two cuts.

4. A method as claimed in claim 1, wherein the tree is topped above the upper portion of the trunk before connecting the helicopter to the tree.

5. A method as claimed in claim 1, wherein the upper portion of the trunk is carried away by the helicopter to a remote point.

6. A method as claimed in claim 1, wherein the helicopter has a hook suspended therefrom and is connected to the tree by engaging the hook with a loop member connected to the upper portion of the trunk near the top thereof.

7. A method as claimed in claim 1, wherein the helicopter has a pilot's seating position and a center of gravity, a first attachment point to one side of the pilot's seating position below the helicopter and a second attachment point below the center of gravity, a hook being initially suspended from the first attachment point to engage the tree and, after engaging the tree, the hook being suspended below the second attachment point for transport of the trunk to a remote point.

8. A method as claimed in claim 1, wherein the tree is cut and the connecting portion is dimensioned so that the connecting portion is capable of supporting the upper portion of the trunk, at least with the aid of wedges in the cut, until the connecting portion is broken and the upper portion of trunk is carried away by the helicopter.

9. A method to as claimed in claim 8, wherein the tree is cut and the connecting portion is dimensioned such that the helicopter is capable of breaking off the connecting portion of the trunk when the helicopter is connected to the upper portion of the trunk near the top of the trunk and flown away from the tree.

10. A method as claimed in claim 6, wherein the hook has an elongated guide extending downwardly therefrom, the guide being moved against the loop member by the helicopter and then the hook engaging the loop member to connect the helicopter to the trunk.

11. A jig apparatus for cutting a tree with a trunk, comprising:
    two guide bars, at least one of the guide bars having an adjustable stop mechanism;
    means for connecting the guide bars to the trunk of the tree in horizontal, parallel positions on opposite sides thereof;
    a chain saw mount slidingly received on each of the guide bars, whereby, when a chain saw is placed on the chain saw mount and moved towards the trunk of the tree along the guide bars, the tree is cut to a position determined by the stop mechanism on the guide bars.

12. A jig apparatus as claimed in claim 11, wherein each of the guide bars has a stop mechanism.

13. A jig apparatus has claimed in claim 11, wherein the means for connecting includes spikes.

14. A jig apparatus as claimed in claim 11, wherein the chain saw mounts are slidingly received on the guide bars by rollers received in guide tracks.

15. A jig apparatus as claimed in claim 11, wherein the guide bars are interconnected by at least one connecting bar.

16. A jig apparatus as claimed in claim 15, wherein the guide bars have plates connected thereto with slots for receiving the connecting bar.

17. A jig apparatus as claimed in claim 16, wherein there are two connecting bars interconnecting the guide bars.

18. A jig apparatus as claimed in claim 17, wherein one of the connecting bars is positioned to be received in a cut on the trunk of the tree opposite the chain saw mounts.

19. A helicopter logging apparatus, comprising:
    a helicopter having a pilot's seating position, a center of gravity, a first attachment point below the helicopter to one side of the pilot's seating position and a second attachment point below the center of gravity;
    a first cable connected to the first attachment point;
    a second cable connected to the second attachment point;

means for lengthening the first cable; and a grapple tool having a body with a top, a bottom and a side, a first attachment means on the top and a second attachment means on the top spaced apart from the first attachment means, the first cable being connected to the first attachment means of the grapple tool and a second cable being connected to the second attachment means of the grapple tool, an elongated guide connected to the body at the bottom thereof by a hinge and hook means on the side of the body for engaging an object.

* * * * *

UNITED STATES PATENT AND TRADEMARK OFFICE
CERTIFICATE OF CORRECTION

PATENT NO.   : 6,167,928
DATED        : January 2, 2001
INVENTOR(S)  : Philip Jarman It is certified that error appears in the above-identified patent and that said Letters Patent is hereby corrected as shown below:

In the fourth sentence of the Abstract, change "a hook on the body" to --an elongated--.
In the last sentence of the Abstract, change "mounted" to --mount--.

Col. 1, line 4, change "systems" to --system--.

Col. 1, line 13, change "thin" to --thing--.

Col. 4, line 26, change "led" to --lean--.

Col. 6, line 46, Claim 13, change "has" to --as--.

Signed and Sealed this

Twenty-ninth Day of May, 2001

*Attest:*

NICHOLAS P. GODICI

*Attesting Officer*  *Acting Director of the United States Patent and Trademark Office*